July 12, 1955 P. L. OSTAPKOVICH 2,713,133

GERMANIUM DIODE AND METHOD FOR THE FABRICATION THEREOF

Filed June 5, 1952

INVENTOR.
PETER L. OSTAPKOVICH

BY

[signature]

ATTORNEY

United States Patent Office 2,713,133

Patented July 12, 1955

2,713,133

GERMANIUM DIODE AND METHOD FOR THE FABRICATION THEREOF

Peter L. Ostapkovich, Philadelphia, Pa., assignor to Philco Corporation, Philadelphia, Pa., a corporation of Pennsylvania Application June 5, 1952, Serial No. 291,858

13 Claims. (Cl. 317—239)

Figure 1:
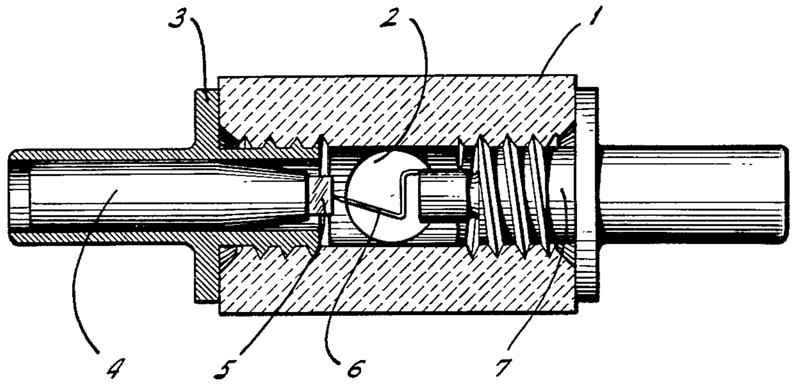

The present invention relates to improvements in the composition and manufacture of asymmetrically-conductive semi-conductor devices, and more particularly it relates to improved crystal rectifiers suitable for use in frequency conversion.

There are many well known applications of crystal rectifiers in which the noise performance thereof is of utmost importance. For example, such crystal rectifiers are commonly used as mixers for converting radio frequencies to intermediate frequency signals in high gain superheterodyne receivers, such as may be employed in long-range communication ssytems or radar systems. In such receivers, the effectiveness of increasing the gain of amplifiers following the crystal mixer is limited principally by the noise generated in the crystal. When the noise generated in the crystal is substantially greater than the signal to be received, increases in receiver gain are no longer effective to improve the useful sensitivity. The amount of noise generated by the crystal mixer will, therefore, generally place an upper limit upon the maximum separation of transmitter and receiver in a communication system, or upon the maximum range of a radar system for example.

One generally-accepted criterion of noise performance for a crystal in such applications, is the noise figure F, defined as the product of the conversion loss and the noise temperature of the crystal. As has been indicated hereinbefore, the crystal mixer is usually by far the greatest contributor to the overall noise figure of the receiver, and is therefore at least an approximate index to the maximum signal sensitivity of which the receiver is capable. For these and other reasons, it has become highly desirable to produce crystals suitable for mixers and detectors which are characterized by the lowest possible noise figure.

In the past, mass production of crystals having consistently low noise figures has not been possible. The procedure generally utilized heretofore has been to produce the crystals in large numbers, and then to select, by individual testing, the relatively small fraction thereof which are characterized by adequately low noise figures. The noise figures of even these selected crystals have typically been of the order of 10 to 15 decibels, for example. Although occasionally a crystal of substantially lower noise figure might be obtained by these methods, such anomalous improvements in noise figure were not understood, and could not be obtained consistently. It is obvious that such a process in which each crystal must be tested individually and a large number rejected, is inefficient and expensive.

Another related difficulty which has been experienced in obtaining low-noise crystals, arises from the fact that it is customary to cut the final crystals from a relatively large ingot which is usually not entirely homogenous. Typically, the noise figures of the cut crystals have been quite critically dependent upon the position in the ingot from which they came, only a relatively small portion of the ingot producing crystals of acceptable noise figures. The convenient method of growing large crystal ingots and cutting the final small crystals therefrom, has therefore been wasteful and inefficient when low-noise crystals were required.

It is therefore an object of my invention to provide asymmetric semiconductive devices of substantially improved noise figures.

Another object is to provide such devices which may be produced in large quantities, while maintaining the noise figures thereof consistently low.

Still another object is to provide a composition of matter suitable for use in the rectification of high frequency signals, which provides consistently low noise figures.

A further object of the invention is to provide a relatively large body of semiconductive material of such nature that small crystals, cut from widely-separated portions of the body, will be characterized by substantially uniform noise figures.

Still another object is to provide an improved method for the fabrication of low-noise semiconductor devices.

In accordance with my invention, the above objectives are attained by constituting the crystalline semiconductive body of the rectifying element from a new and unexpectedly advantageous composition of matter. Whereas formerly it had been believed that best results with regard to noise figure would be obtained by employing a semiconductive material comprising germanium in the purest form obtainable plus only a principal or primary impurity, I have found that substantially improved noise figures are obtained from crystals containing, in addition, a secondary impurity in an amount which is an order of magnitude less than that of the primary impurity.

More specifically, the preferred embodiment of my invention employs a composition of matter which is composed of bismuth in an amount between substantially 0.01% and 0.04% by weight, antimony in an amount between substantially 0.1% and 0.3% by weight, and the remainder of germanium which is substantially free from other significant impurities. It will be understood hereinafter that the term "significant impurities" refers to materials which act as donors or acceptors of electrons in the germanium crystal lattice, while the term "insignificant impurities" refers to those impurities which do not act to any substantial extent as either donors or acceptors.

I have found that when the amount of the secondary impurity bismuth is substantially less than 0.01% or substantially greater than 0.04% by weight, noise figures comparable to those of the prior art are obtained. However, when the bismuth content lies within a critical range extending from substantially 0.01% to 0.04%, very substantial reductions in noise figure are obtained. Preferably, the amount of bismuth is near the center of this range at approximately 0.02%, for which value noise figures of about 6 to 8 db are consistently obtained, with occasional instances of noise figures of 5 db or less.

The noise figures of the crystals thus produced are relatively uncritical with respect to variations of the bismuth content about the preferred value of 0.02% and within the specified range. Thus, the bismuth content may be varied from 0.015% to 0.03% without seriously increasing the noise figures obtained. This lack of criticalness as to bismuth content within the specified range is believed to be responsible at least in part for the fact that consistently low noise figures can be obtained for crystals derived from widely-separated portions of a relatively large ingot of germanium. Even though there may be some tendency for the bismuth to distribute itself non-uniformly throughout the ingot during the crystallizing process, the resultant variations in concentration are apparently not sufficiently great to produce any substantial non-uniformities in the noise figures of crystals derived from different portions of an ingot of the normal practical dimensions. Thus, I have found that, for an ingot having a length of three centimeters, the noise figures obtained have substantially the same low values substantially regardless of the positions within the surface of the ingot from which the cut crystals are derived.

Figure 2:
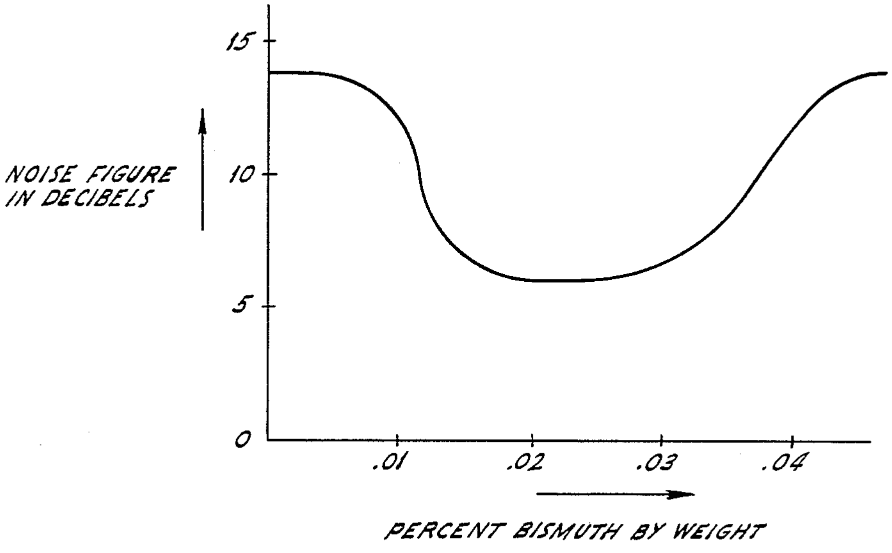

Other advantages and features of the invention will become apparent from a consideration of the following detailed description, taken in connection with the accompanying drawings, in which:

Figure 1 is a sectional view of a typical crystal cartridge containing a semiconductive material in accordance with the invention; and Figure 2 is a graph illustrating the effects of various amounts of bismuth upon the noise figure of crystals constituted in accordance with the invention.

In Figure 1, there is shown a crystal cartridge assembly of the coaxial type embodying the invention, and suitable for use as a rectifier or mixer in the conversion of radio-frequency signals of approximately 10,000 megacycles per second, to intermediate frequency signals of approximately 60 megacycles per second, for example. This assembly may be generally conventional except for the constitution of the crystal material itself. Thus, the assembly may comprise a ceramic cartridge case 1 in the form of a hollow cylinder, threaded at each end, and having a circular opening 2 through one wall thereof. Into one end of cartridge 1 there may be inserted threaded plug member 3, which is hollow so as to accommodate a crystal-bearing rod member 4 press-fitted into it. The crystal member 5 may be soldered to rod 4, and is point-contacted by means of a whisker 6 of a suitable material such as tungsten or titanium, welded or otherwise fastened to a whisker-bearing plug member 7 threaded into the opposite end of cartridge 1. If desired, the crystal assembly may be impregnated with a suitable wax material, and opening 2 may be sealed with an appropriate sealing wax.

The crystal member 5 is preferably composed principally of nearly pure germanium, to the extent of 99.78% by weight in the preferred embodiment, alloyed with antimony in the amount of 0.2% by weight, and bismuth in the amount of 0.02% by weight. Although the germanium content is preferably substantially pure, the 99.78% of germanium may also include an appreciable amount of insignificant impurities, such as silicon and carbon, for example. In some instances, the amounts of these insignificant impurities may be as great as 0.78% by weight, for example. However, with regard to significant impurities, other than the antimony and bismuth in the amounts specified, the amounts of such impurities should be maintained below 0.01% and preferably on the order of .001% or less, by weight.

The effects of the addition of bismuth are represented generally in Figure 2. It will be understood with regard to this figure that the exact nature of the variation of noise figure with bismuth content is not precisely known for all values of bismuth content, but that sufficient information has been obtained to indicate that this variation possesses the general characteristics shown by the graph.

Referring to Figure 2 in more detail, the ordinates of the graph represent the noise figures of antimony-doped germanium crystals expressed in decibels, while the abscissae represent the corresponding bismuth content of these crystals expressed in percentage weight. These values of noise figure were obtained when the crystals were used as mixers in a superheterodyne receiver of microwaves in the 10,000 megacycle band. However, it will be understood that the advantages of the invention are not limited to use at these frequencies, experiments having shown that similar improvements in noise figure are obtained at 1,000 megacycles per second, for example. For bismuth percentages of less than 0.01 percent, the noise figure is substantially equal to 13 decibels, which is typical of prior art crystals. However, above 0.01 percent the noise figure dips sharply to a value of about 6 decibels, and then rises again to substantially 13 decibels for bismuth contents of about 0.04 percent. Throughout the entire region from 0.01 percent to 0.04 percent of bismuth by weight, improvements in noise figure with respect to the prior art are obtained, and, within the substantial range between 0.015 percent and 0.03 percent the noise figure is substantially equal to 6 decibels. As noted hereinbefore, it is believed to be this uniformly excellent noise performance obtained over a substantial range of bismuth contents, within the range of improvement between 0.01 percent and 0.04 percent, which permits the obtaining of crystals of excellent noise performance from any or all of a large variety of widely-separated positions within a relatively large crystal ingot.

The process for fabricating crystals in accordance with the invention may be the same as that employed by the prior art, with the important exception of the addition of the secondary impurity bismuth along with the primary impurity antimony. Thus, the process of producing the crystal material normally begins with germanium oxide, which is reduced to provide relatively pure germanium. This germanium may then be further purified by melting it, progressively cooling it so as to concentrate impurities in one end, and then selecting the purified portion of the germanium for subsequent use. This purified germanium may then be placed into a crucible arranged for vertical ingot production by placement within a radiant heating device suitably arranged to provide an appropriate temperature gradient through the germanium material. The germanium is melted by means of heat from the above-mentioned radiant heaters, and then caused to solidify progressively and slowly under carefully controlled conditions so as to obtain a relatively large ingot of germanium which is single crystalline. However, before cooling and solidification, and preferably before melting, the primary and secondary impurities, constituting antimony and bismuth in the amounts hereinbefore indicated, are added to the germanium. The single crystal ingot produced therefore comprises an alloy of germanium, antimony and bismuth, in accordance with the percentages indicated hereinbefore. This ingot may be generally cylindrical in form, and may commonly have a length of 2 to 3 centimeters, for example.

The crystal ingot may then be cut into appropriate small slabs by means of a diamond cutting wheel, soldered to the rod member 4 of Figure 1, and provided with a suitable high polish.

The whisker 6, appropriately cut, pointed and crimped, may be welded or soldered to threaded plug member 7. A suitable cement may then be applied to the threads of plug member 7, after which it is screwed into one end of the ceramic case. The hollow plug member 3 may be similarly assembled in the opposite end of the cartridge case.

The crystal-bearing rod member 4 may then be forced through hollow plug member 3 until contact is made with the whisker, and then advanced another two thousandths of an inch. A D.-C. forming current of 0.1 ampere may be passed through the contact between whisker and crystal, until the desired voltage-current characteristic is obtained. If desired, suitable wax impregnation may then be provided by way of opening 2, and the opening sealed.

Since both the general structural arrangement of Figure 1 and the fabrication process of Figure 2 are substantially identical with prior art arrangements and methods, with the important exception of the addition of bismuth in the proper amounts, it is believed unnecessary to provide herein a further detailed description thereof.

Although the invention has been described with specific reference to certain applications thereof, it will be appreciated that it is actually susceptible of embodiment in any of a wide variety of forms without departing from the spirit of the invention. In particular, the invention is obviously not limited to any specific form of geometry or construction of the crystal cartridge, or of any of the parts thereof with the exception of the constitution of the crystal plate itself, or to any particular apparatus for practicing the disclosed method of fabrication.

I claim:

1. As a semiconductive material for asymmetrically-conductive devices, that composition of matter which comprises substantially 0.01 percent to 0.04 percent of bismuth by weight and 0.1 percent to 0.3 percent of antimony by weight, the remainder comprising germanium substantially free from other significant impurities.

2. The composition of claim 1, in which the bismuth content is substantially equal to 0.02 percent by weight.

3. The composition of claim 2 in which the antimony content is substantially equal to 0.2 percent by weight.

4. The composition of claim 3, in which said remainder is free from significant impurities having concentrations greater than 0.01 percent by weight.

5. A germanium crystal of improved electrical characteristics, said crystal consisting essentially of germanium, with a primary impurity of antimony in an amount between the limits of substantially 0.1 percent and 0.3 percent by weight, and with a secondary impurity of bismuth in an amount between the limits of substantially 0.01 percent and 0.04 percent by weight.

6. The crystal of claim 5, in which the bismuth content is substantially equal to 0.02 percent by weight.

7. The crystal of claim 5, in which the antimony content is substantially equal to 0.2 percent by weight.

8. A germanium crystal rectifier of improved noise performance, said rectifier comprising: a body of semiconductive material comprising bismuth in an amount between substantially 0.01 percent and 0.04 percent by weight and antimony in an amount between substantially 0.1 percent and 0.3 percent by weight, the remainder comprising germanium substantially free from other significant impurities; and a metallic contacting element making small-area contact with said body of material.

9. The rectifier of claim 8, in which the bismuth content is substantially equal to 0.02 percent by weight.

10. The method of fabricating an ingot of semiconductive material for use in signal translating devices, said method comprising the steps of: forming a melt consisting essentially of germanium, antimony in an amount between substantially 0.1 percent and 0.3 percent by weight, and bismuth in an amount between substantially 0.01 percent and 0.04 percent by weight; and cooling said melt to produce a crystalline semiconductive ingot.

11. The method of fabricating an ingot of semiconductive material for use in signal translating devices, said method comprising the steps of: forming a melt consisting essentially of germanium, antimony in an amount between substantially 0.1 percent and 0.3 percent by weight, and bismuth in an amount substantially equal to 0.02 percent by weight; and cooling said melt to produce a crystalline semiconductive ingot.

12. The method of manufacturing semiconductive crystal bodies of improved noise figures, said method comprising the steps of: forming a melt consisting essentially of germanium, antimony in the amount of substantially 0.1 percent to 0.3 percent by weight, and bismuth in the amount of substantially 0.01 percent to 0.04 percent by weight; cooling said melt to produce a crystalline ingot; and dividing said ingot into a plurality of smaller crystal bodies.

13. The method of manufacturing semiconductive crystal bodies of improved noise figures, said method comprising the steps of: forming a melt consisting essentially of germanium, antimony in the amount of substantially 0.1 percent to 0.3 percent by weight, and bismuth in an amount substantially equal to 0.02 percent by weight; cooling said melt to produce a crystalline ingot; and dividing said ingot into a plurality of smaller crystal bodies.

References Cited in the file of this patent

UNITED STATES PATENTS

| | | |
|---|---|---|
| 2,514,879 | Lark-Horovitz et al. | July 11,, 1950 |
| 2,583,008 | Olsen | Jan. 22, 1952 |
| 2,602,211 | Scaff et al. | July 8, 1952 |